United States Patent
Hall

(10) Patent No.: US 10,865,007 B2
(45) Date of Patent: Dec. 15, 2020

(54) LABEL PICKING ARRANGEMENT AND METHOD FOR PICKING LABELS

(71) Applicant: Rollquett Patent AB, Bromma (SE)

(72) Inventor: Leif Hall, Bromma (SE)

(73) Assignee: ROLLQUETT PATENT AB, Bromma (SE)

( * ) Notice: Subject to any disclaimer, the term of this patent is extended or adjusted under 35 U.S.C. 154(b) by 93 days.

(21) Appl. No.: 15/766,956

(22) PCT Filed: Oct. 17, 2016

(86) PCT No.: PCT/SE2016/051001
§ 371 (c)(1),
(2) Date: Apr. 9, 2018

(87) PCT Pub. No.: WO2017/069682
PCT Pub. Date: Apr. 27, 2017

(65) Prior Publication Data
US 2018/0305060 A1    Oct. 25, 2018

(30) Foreign Application Priority Data
Oct. 21, 2015 (SE) ........................... 1551354

(51) Int. Cl.
*B65C 9/18* (2006.01)
*B29C 49/24* (2006.01)
*B29C 33/12* (2006.01)

(52) U.S. Cl.
CPC ............ *B65C 9/1826* (2013.01); *B29C 33/12* (2013.01); *B29C 49/2408* (2013.01);
(Continued)

(58) Field of Classification Search
CPC . B65G 47/91; B29C 45/14; B29C 2049/2449; B29C 2049/2427;
(Continued)

(56) References Cited

U.S. PATENT DOCUMENTS 1,426,930 A * 8/1922 Waldron ............... B66C 1/0212
294/188
3,180,608 A 4/1965 Frederick
(Continued)

FOREIGN PATENT DOCUMENTS

| WO | 03066493 A1 | 8/2003 |
| WO | 2016024898 A1 | 2/2016 |

OTHER PUBLICATIONS

International Search Report from corresponding International Patent Application No. PCT/SE2016/051001, dated Jan. 4, 2017.

*Primary Examiner* — Laura M Lee
(74) *Attorney, Agent, or Firm* — Tucker Ellis LLP

(57) ABSTRACT

A label picking apparatus includes an anvil having a cavity and a picking element. A support surface surrounding the cavity and a picking surface of the picking element are respectively connectable to an under pressure source for respectively holding a web of material to the support surface and pre-cut label to the picking surface, the pre-cut label attached with the web of material with micro material bridges. The picking surface moveable into the cavity to release the label from the web. The picking surface has an inner surface and an outer surface. The outer surface is formed from ends of protrusions that each extend from the inner surface, the protrusions of the picking surface made from high-friction material.

20 Claims, 4 Drawing Sheets

(52) U.S. Cl.
CPC .......... *Y10T 83/2183* (2015.04); *Y10T 225/12* (2015.04); *Y10T 225/307* (2015.04)

(58) Field of Classification Search
CPC ............. Y10T 83/2183; Y10T 83/2184; Y10T 83/2079; Y10T 83/0457; Y10T 83/2185; Y10T 225/12; Y10T 225/307; B65C 9/1826; B65C 9/1896; B65C 2009/0056; B26F 3/02; B26F 3/002
USPC ............ 225/106; 83/151, 25, 103, 280–281; 493/342, 373; 271/90–108; 248/363; 294/188
See application file for complete search history.

(56) References Cited

U.S. PATENT DOCUMENTS

| | | | |
|---|---|---|---|
| 4,185,814 A | 1/1980 | Buchmann | |
| 4,931,341 A * | 6/1990 | Haffer | B65G 47/91 209/905 |
| 5,082,439 A | 1/1992 | Kaminski | |
| 5,344,305 A | 9/1994 | McKillip | |
| 5,431,763 A | 7/1995 | Bradshaw | |
| 5,908,590 A | 6/1999 | Yoshimi | |
| 6,990,723 B1 | 1/2006 | Hoogland | |
| 7,240,935 B2 * | 7/2007 | Schmierer | B65G 47/91 294/189 |
| 2004/0050225 A1* | 3/2004 | Steiner | B26D 7/1818 83/13 |
| 2005/0160888 A1* | 7/2005 | Hoogland | B26D 7/1863 83/13 |
| 2009/0060688 A1* | 3/2009 | Asada | H01L 21/6838 414/217 |
| 2010/0296903 A1* | 11/2010 | Shah | H01L 21/6838 414/589 |
| 2014/0341699 A1* | 11/2014 | Lopez | H01L 21/6838 414/800 |

* cited by examiner

LABEL PICKING ARRANGEMENT AND METHOD FOR PICKING LABELS

The present invention concerns a label picking arrangement for picking labels, especially in-mould labels (IML).

It is a problem picking labels and delivering them to, for example a mould, while keeping the exact positions and decreasing the risk of bending or crinkling the labels. Having a web with pre-cut labels still attached to the web, for example by micro material bridges, and picking the labels therefrom by tearing them off is a way to minimize the problems described above. Although there will still remain some problems with translations of the labels in the tearing moment as well as rupturing and crinkling.

SUMMARY OF THE INVENTION

The present invention aim at delimiting the above problems to an even less problem limit or problem free limit. It concerns a label picking arrangement and a method of picking labels.

According to a first aspect of the present invention a label picking arrangement is provided comprising at least one anvil having at least one cavity and at least one picking element having a picking surface. The label picking arrangement is connectable to an under pressure source in use, wherein the at least one cavity being surrounded at least partially with at least one support surface being provided, at least intermittently, with under pressure.

By means of the under pressure provided at the at least one support surface a web with pre-cut labels will stay in position at the anvil during picking.

According to an embodiment of the present invention also each picking element is provided, at least intermittently, with under pressure. This further reassures the position of each label.

According to an embodiment each picking element is movable into corresponding cavity. Thus no tearing off of the label will take place. Instead only a shearing of the material bridges will occur when the picking element moves into the corresponding cavity. This further reassures the position of each label.

According to an embodiment the picking element has a picking surface in one plane. According to a further embodiment the support surface is flat and parallel to the plane of the picking surface.

According to an embodiment the picking element and/or the support surface are made of high friction material. This will further minimise the risk of any sliding of the web and/or label during the picking movement and reassure the right position of each label.

According to a further embodiment the high friction material has protrusions attached on a surface, the protrusions are of the same length and their ends are making up a parallel surface. In such a way the under pressure may work between the protrusions against the web/labels. Having a material with a high friction coefficient will assure a tight holding during under pressure for movement parallel with the plane of the label/web but less holding force for movements out from the picking surface, for example when the picking element is in the next position where the label is detached for the next step in a process, such as moulding.

According to a further embodiment the protrusions are distributed in such a way that no straight lines are formable between rows of protrusions. In this way the risk of crinkling is further minimised.

According to a further embodiment the protrusions have a length less than 3 mm, preferably less than 2 mm and most preferred less than 1 mm. Preferably, the protrusions have a high friction coefficient, for example made of rubber like material.

According to one embodiment, the number of cavities corresponds to the number of picking elements. Preferably, a shape of the picking surface corresponds to a shape of a corresponding cavity in the anvil. Thus the micro bridges will be sheared and the forces on the label will be minimized.

According to one embodiment the under pressure is provided along at least one slot at the picking surface and/or support surface. Preferably, the slot is provided surrounding the picking surface and/or the cavity along an edge of the support surface. An advantage with this is that the under pressure will be spread between the protrusions over the full area and thus making it difficult to pull/slide the label sideways in the plane of the label/web. On the other hand when pulling out of the plane, for example when a label is to be picked off at the next position, the under pressure will leak as soon as the edge somewhere encircling the label is lifted, i.e. over the slot providing the under pressure, and thereafter the label is easily removed. Then the slot will not be able to evacuate all the air coming in under the label.

According to another embodiment the under pressure is provided via small holes distributed over the picking surface and/or support surface.

According to one embodiment the label picking arrangement is adapted to be able to pick labels from a web with pre-cut labels still attached to the web, for example by micro material bridges, wherein the web of labels may travel between the at least one picking element and the at least one cavity, in use. Preferably, the web is adapted to travel close along the at least one support surface of the at least one anvil. It is an advantage if the shape of a picking surface corresponds to the geometry of a label provided in the web and to the corresponding cavity, wherein all shapes are in line at use when picking a label. Preferably, the picking element is pushable into the corresponding cavity and thus the corresponding label in the web, in use, so as to release the label from the web.

According to a second aspect of the present invention a method for picking labels is provided, whereby a web of pre-cut labels still attached to the web, for example by means of micro bridges, travels in front of at least one anvil having at least one cavity, being intermittently positioned at the at least one anvil at a support surface, surrounding at least partially the at least one cavity, by means of under pressure provided at the support surface.

According to an embodiment at least one picking element provided with under pressure moves towards the web of pre-cut labels and the at least one anvil, when in position at the corresponding label the picking element adheres to the label by means of the under pressure, and thereafter the picking element moves further, into the corresponding cavity of the anvil, thereby releasing the label from the web.

According to a further embodiment the shape of the picking element, the labels and the cavities are corresponding and the web is aligning the at least one label with a corresponding at least one cavity.

SHORT DESCRIPTION OF DRAWINGS

The present invention will now be described in detail by means of embodiments together with drawings, in which FIG. 1 shows an embodiment of an anvil in accordance with the present invention in a perspective view.

Figures 5A, 5B, 5C:
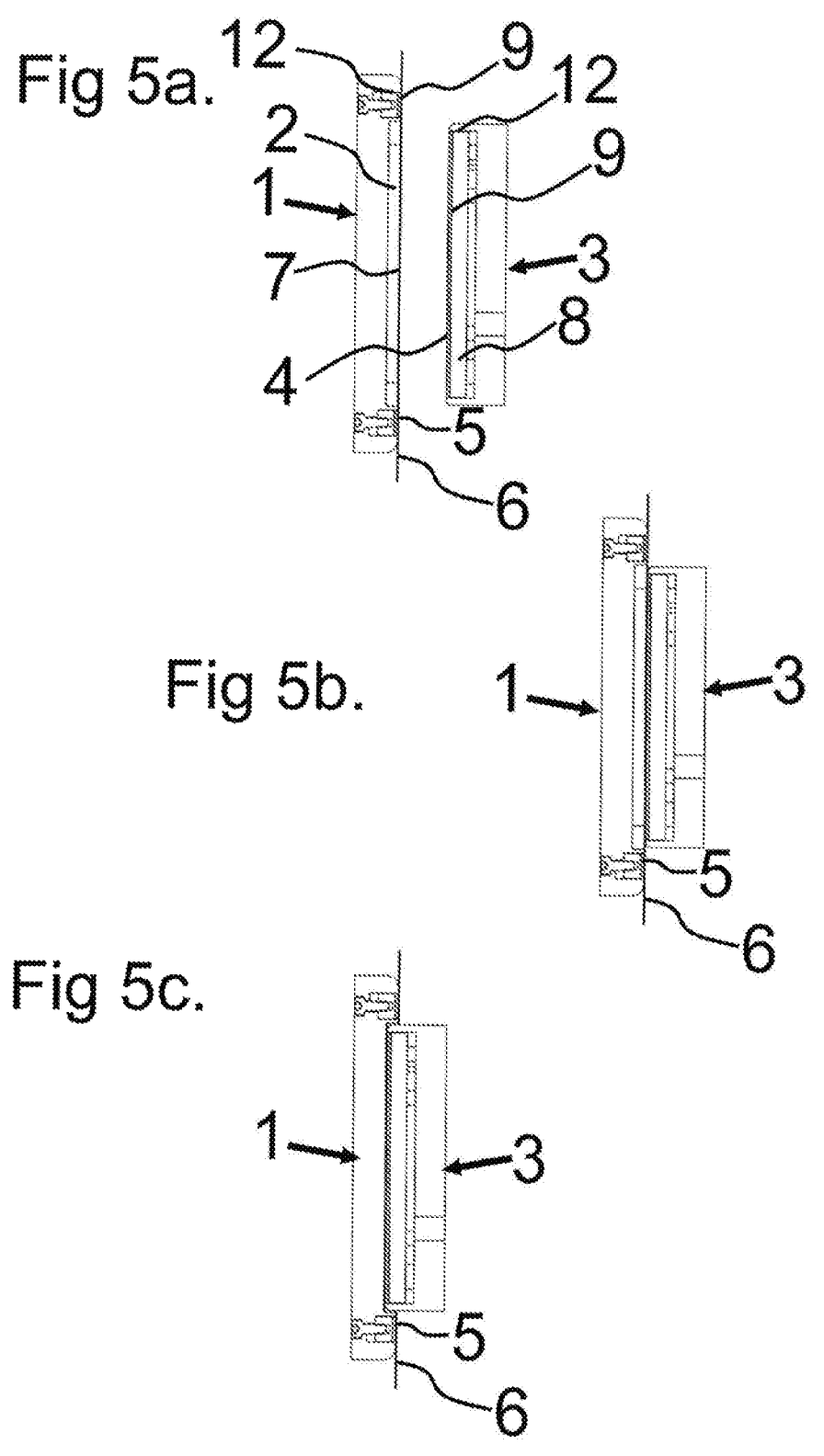

FIG. 5a, b, c shows an anvil and a picking element during a cycle of picking of a label in a sectional view.

Figure 6:
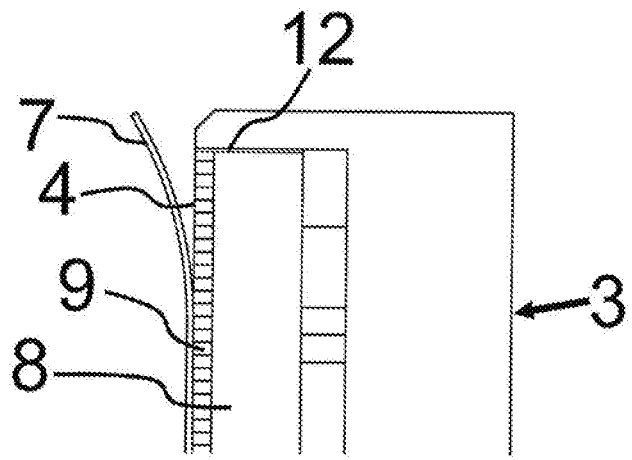

FIG. 6 shows a removal of a label from a picking element in a sectional view.

Figure 7:
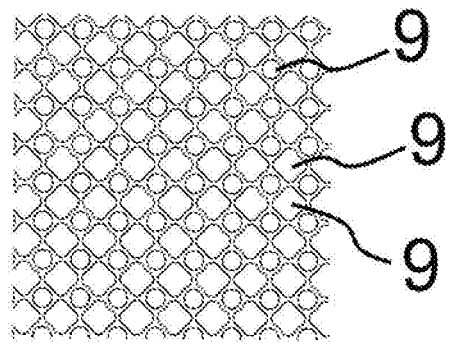

FIG. 7 shows a pattern of protrusions in a front view.

Figure 2:
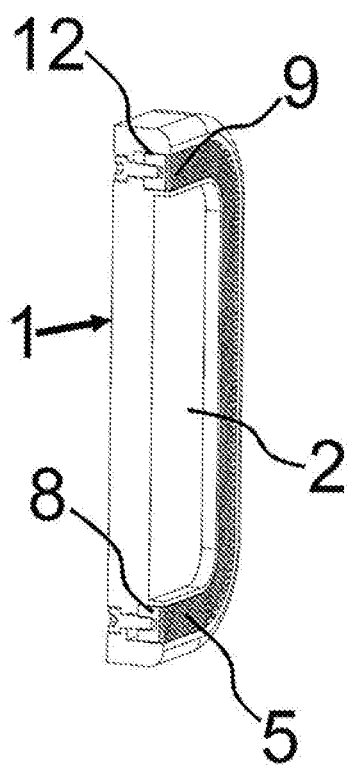
FIG. 2 shows the anvil of FIG. 1 in a sectional, perspective view.
Figure 8:
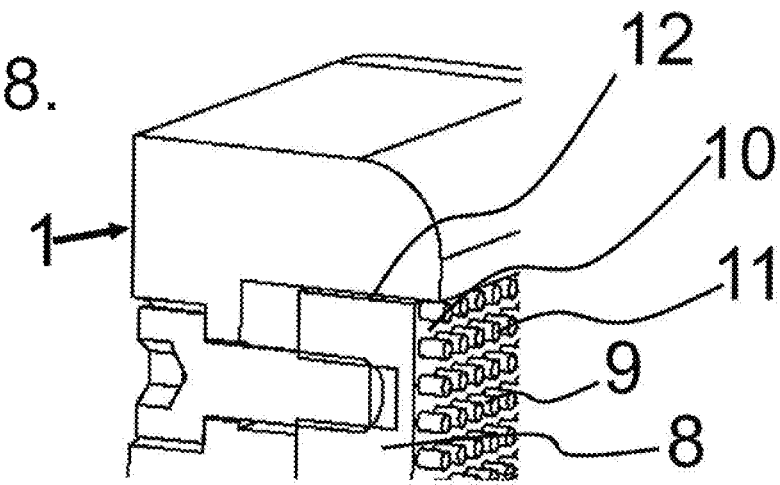

FIG. 8 shows a detail of the anvil of FIG. 2.

DETAILED DESCRIPTION OF EMBODIMENTS OF THE PRESENT INVENTION

The present invention will now be described by means of embodiments. These are only examples and should not be interpreted to restrict the invention. The scope of the invention is depending on the claims attached.

Figure 1:
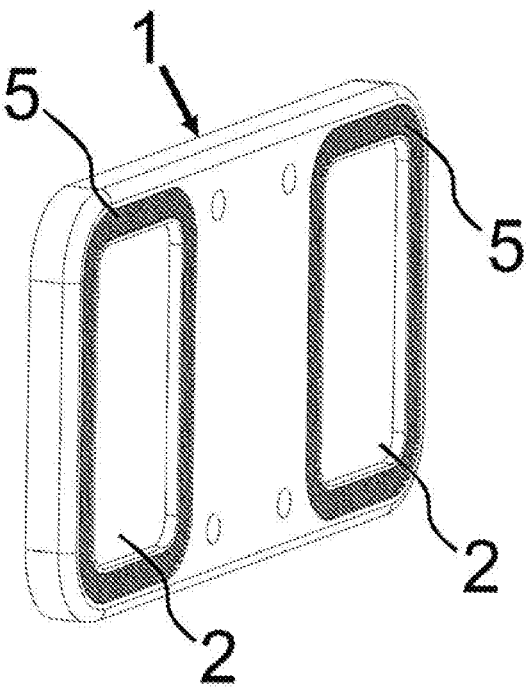
Figure 3:
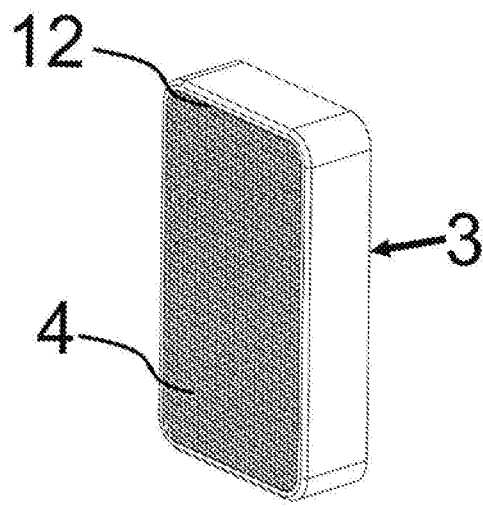
FIG. 3 shows an embodiment of a picking element in accordance with the present invention in a perspective view.

An inventive label picking arrangement is provided comprising at least one anvil 1 having at least one cavity 2, see FIG. 1, and at least one picking element 3 having a picking surface 4, see FIG. 3. Each cavity 2 is at least partially surrounded with at least one support surface 5. The anvil 1 is provided with under pressure in any known way and the support surface 5 is intermittently provided with this under pressure, which will be described below. Also the picking element 3 is provided with under pressure in any known way and the picking surface 4 is constantly or intermittently provided with this under pressure, which will be described below.

Figure 4:
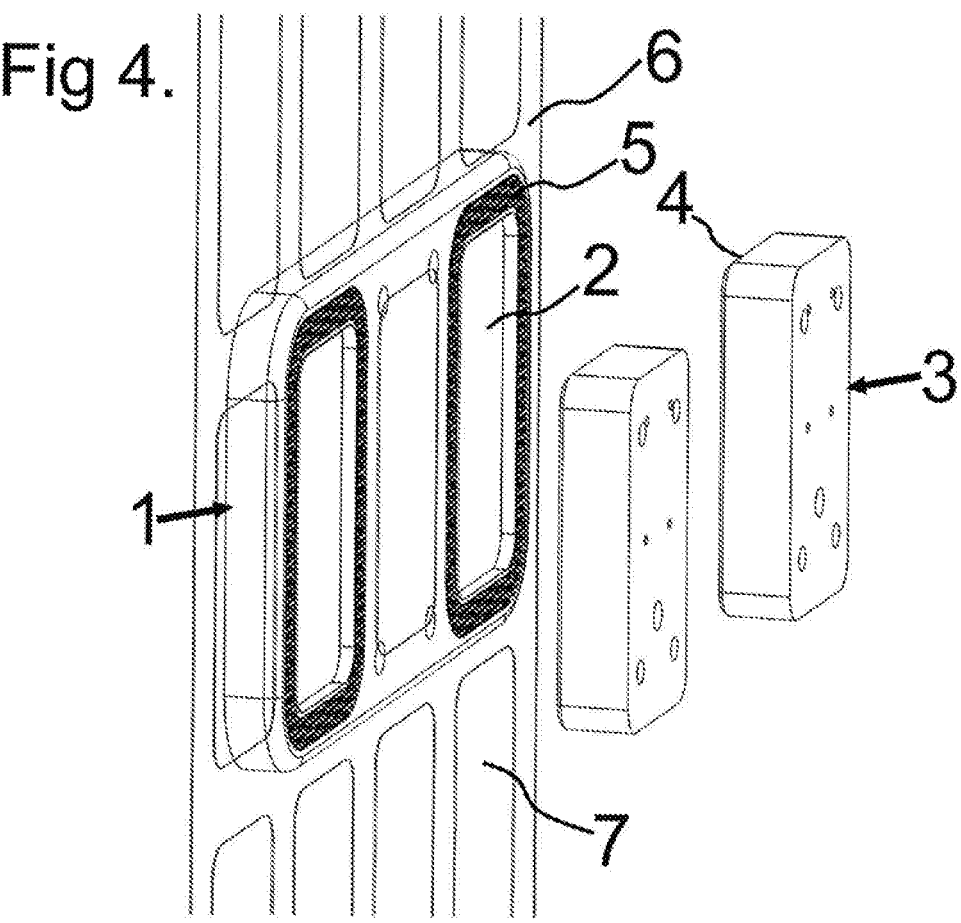
FIG. 4 shows an anvil and a picking element with a web of labels in between before picking a label, in perspective view.

Each picking element 3 is movable into a corresponding cavity 2 in the anvil 1, see FIGS. 4 and 5a, b, c. The picking elements 3 may be arranged at ends of movable bars provided on supports, for example, or in other conceivable ways for the person skilled in the art. The anvils 1 may be provided on supports, for example. An inventive label picking arrangement may comprise one or several picking elements 3 and preferably the corresponding number of cavities 2 arranged in one or more anvils 1. In FIG. 1 two cavities 2 are arranged in one anvil 1. Preferably the shape of the cavity 2 corresponds to a label 7 to be picked and preferably also the shape of the picking surface 4 corresponds to the shape of the cavity 2.

Before going into more details about the label picking arrangement the inventive method will be described. See FIGS. 4 and 5a, b, c. The method concerns picking labels from a continuous web 6 with pre-cut labels 7. Usually the labels 7 are still connected by means of small material bridges, so called micro bridges. Thus the web 6 of labels 7 travel in front of the at least one anvil 1, preferably close to the anvil/s. When a label 7, or two as would be the case for the anvil 1 shown in FIGS. 1 and 4, is in position. i.e. aligned, directly outside the corresponding cavity 2 the under pressure is turned on. The under pressure is provided at the support surface 5, see above. Thus the under pressure will suck the web 6 against the support surface 5 leaving the label 7 stretched over the recess of the cavity 2, see FIGS. 4 and 5a. Thus the label 7 is ready to be separated from the web 6 by means of a corresponding picking element 3.

Then the picking element 3 moves towards the label 7 in the web 6 and the anvil 1 behind the web 6. Before reaching the label 7 stretched over the cavity 2, the under pressure is turned on and the label 7 is sucked against the picking surface 4 of the picking element 3. See FIG. 5b. It is also possible to have a constant under pressure provided at the picking surface. Thereafter the picking element 3 moves further into the cavity 2, thereby shearing the material bridges. See FIG. 5c. The under pressure is still provided both to the picking surface 4 and support surface 5. Since the web is tightly held at the support surface 5 and the label 7 is tightly held at the picking surface 4 the pushing movement will concentrate the pushing forces to the micro bridges and thus they will break. It has shown in test that also poorly pre-cut labels will detach from the web easily without any destroying or disturbing effects on the released label 7.

Thereafter the picking element 3 is withdrawn and ready to expose the picked label 7 at desired position. The under pressure is turned off from the anvil 1 and the web 6 may travel a suitable distance in order to get labels 7 in line with the corresponding cavities 2. The picking element 3 is moved to a position where the label 7 is detached from the picking element 3 and gets ready to pick another label 7.

Going back to describe the label picking arrangement, the picking element 3 has a picking surface 4 in one plane. The support surface 5 is flat and parallel to the plane of the picking surface 4.

To further enhance the possibility to keep the labels 7 in the right position during the picking the picking surface 4 and/or the support surface 5 are made of high friction material 8, such as rubber. Preferably, the high friction material 8 has protrusions 9 attached at an inner surface 10, the protrusions are preferably of the same length and their ends are making up an outer surface 11. See FIGS. 2, 5a, 6 and 7. If the protrusions 9 are of the same length the inner 10 and outer 11 surfaces lies in parallel planes.

An example of protrusions are shown in FIG. 7. As the person skilled in the art will understand the protrusions 9 may have any cross sectional shape. According to a preferred embodiment the protrusions are distributed in such a way that no straight lines are formable between rows of protrusions, as shown in FIG. 7. Thus the risk of bending of a label 7 or web 6 along a line is minimized further securing the right position of a picked label 7. For example the protrusions 9 may be distributed in rows where a portion of the protrusion 9 reaches over to an opposite side of a thought straight line between the rows of protrusions 9, thus interrupting the thought straight line whereby a bending of the label 7 is prevented. The protrusions have a length less than 3 mm, preferably less than 2 mm and most preferred less than 1 mm.

The under pressure may be provided along at least one slot 12 at the picking surface 4 and/or support surface 5. Preferably, the slot 12 is provided surrounding the picking surface 4 and/or the cavity 2 along an edge of the support surface 5. See FIGS. 2, 3 and 5a. It is also conceivable to provide the under pressure via small holes (not shown) distributed over the picking surface 4 and/or support surface 5. The under pressure will be spread between the protrusions 9 at the support surface 5 and the picking surface 4. The anvil 1 and picking element 3 may be provided with inner cavities or channels in order to spread the under pressure. The under pressure may be attached by means of hoses at one or more connection openings at the anvil 1 and picking element 3, respectively.

The label picking arrangement may be arranged so that each picking element 3 is in line with corresponding cavity 2 and so that the picking surface 4 is parallel with the support surface 5. Preferably, the movement of the picking element 3 towards and from the cavity 2 is orthogonal to the parallel planes of the picking surface 4 and support surface 5.

The invention claimed is:

1. A label picking apparatus for picking pre-cut labels from a web of material, the label picking apparatus comprising:
   an anvil having a cavity, the cavity at least partially surrounded by a support surface to which an under pressure is, at least intermittently provided; and
   a picking element having a picking surface, the picking element moveable so that the picking surface enters the cavity to break micro material bridges that hold a pre-cut one of the labels that is aligned with the cavity to release the label from the web of material, and wherein an under pressure is, at least intermittently, provided to the picking surface; and
   wherein the picking surface comprises an inner surface distal the pre-cut label and an outer surface proximal the pre-cut label, the outer surface of the picking surface is formed from ends of protrusions that each extend from the inner surface of the picking surface, the protrusions of the picking surface being made from high-friction material, and wherein the outer surface contacting the pre-cut label during the breaking of the micro material bridges so that the under pressure provided to the support surface maintains a relative position of the pre-cut label to the picking surface during the breaking and after the picking element is retracted so that the picking surface and pre-cut label are removed from the cavity.

2. The label picking apparatus according to claim 1, wherein the outer surface of the picking surface is planar.

3. The label picking apparatus according to claim 1, wherein the support surface is parallel to a plane of the picking surface.

4. The label picking apparatus according to claim 1, wherein the protrusions of the picking surface are distributed to prevent bending the pre-cut label along a straight line.

5. The label picking apparatus according to claim 1, wherein each protrusion of the picking surface has a length less than 3 mm.

6. The label picking apparatus according to claim 1, wherein the protrusions of the picking surface have a high friction coefficient.

7. The label picking apparatus according to claim 1, wherein the protrusions of the picking surface are made of rubber.

8. The label picking apparatus according to claim 1, wherein a shape of the picking surface corresponds to a shape of the cavity in the anvil.

9. The label picking apparatus according to claim 1, wherein the under pressure of the picking surface is provided from at least one slot at a perimeter of the picking surface.

10. The label picking apparatus according to claim 1, wherein the under pressure of the support surface is provided from at least one slot at a perimeter of the support surface.

11. The label picking apparatus according to claim 1, wherein the under pressure is provided via holes distributed over the picking surface.

12. The label picking apparatus according to claim 1, wherein the web of material with pre-cut labels travel between the picking element and the cavity.

13. The label picking apparatus according to claim 12, wherein the web travels along the support surface of the anvil.

14. The label picking apparatus according to claim 13, wherein a shape of a picking surface corresponds to a shape of a label provided in the web and corresponds to a shape of the cavity, wherein the picking surface, the label and the cavity are in axial alignment at a time of picking of the label.

15. The label picking apparatus according to claim 1, wherein each protrusion of the picking surface has a length less than 2 mm.

16. The label picking apparatus according to claim 1, wherein each protrusion of the picking surface has a length less than 1 mm.

17. The label picking apparatus according to claim 1, wherein the support surface comprises an inner surface distal the web of material and an outer surface proximal the web of material, the outer surface of the support surface is formed from ends of protrusions that each extend from the inner surface of the support surface, the protrusions of the support surface being made from high-friction material, and wherein the outer surface of the support surface contacts the web of material during the breaking of the micro material bridges so that the under pressure provided to the support surface maintains a relative position of the web of material to the support surface during the breaking.

18. A method for picking a label from a web of material to which pre-cut labels are attached by micro material bridges, the method comprising:
   (a) positioning the pre-cut label between a cavity of an anvil and a picking surface of a picking element, the anvil having a support surface at least partially surrounding the cavity, wherein:
      the picking surface comprises an inner surface distal the pre-cut label and an outer surface proximal the pre-cut label, wherein the outer surface of the picking surface is formed from ends of protrusions that each extend from the inner surface of the picking surface, the protrusions of the picking surface being made from high-friction material;
   (b) retaining the web of material to the anvil by providing an under pressure at the support surface;
   (c) moving the picking element toward the label and providing an under pressure to the picking surface so that the label adheres to picking surface;
   (d) further moving the picking element so that the label and picking surface enters the cavity of the anvil such that the micro material break and the label is released from the web of material; and
   (e) withdrawing the label and picking surface of the picking element from the cavity, during which the under pressure at the picking surface retains the label to the picking surface.

19. The method according to claim 18, wherein a shape of the picking surface, the pre-cut labels and the cavity each coordinate with one another.

20. The method according to claim 18, wherein the support surface has an inner surface distal the web of material and an outer surface proximal the web of material, the outer surface of the support surface is formed from ends of protrusions that each extend from the inner surface of the support surface, the protrusions of the support surface being made from high-friction material, and the outer surface of the support surface contacting the web of material during (a) through (e).

* * * * *